(12) United States Patent
Xia et al.

(10) Patent No.: US 12,378,877 B2
(45) Date of Patent: Aug. 5, 2025

(54) METHOD AND DEVICE FOR IDENTIFYING NEAR-BIT LITHOLOGY BASED ON INTELLIGENT VOICEPRINT IDENTIFICATION

(71) Applicant: Institute of Geology and Geophysics, Chinese Academy of Sciences, Beijing (CN)

(72) Inventors: Muming Xia, Beijing (CN); Canyun Wang, Beijing (CN); Changchun Yang, Beijing (CN); Wenxiu Zhang, Beijing (CN); Fei Tian, Beijing (CN); Zongwei Li, Beijing (CN); Jing Liu, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 295 days.

(21) Appl. No.: 18/340,830

(22) Filed: Jun. 24, 2023

(65) Prior Publication Data
US 2024/0344453 A1  Oct. 17, 2024

(30) Foreign Application Priority Data
Apr. 11, 2023  (CN) .......................... 202310377765.6

(51) Int. Cl.
*E21B 47/14* (2006.01)
*E21B 49/00* (2006.01)

(52) U.S. Cl.
CPC ............ *E21B 47/14* (2013.01); *E21B 49/003* (2013.01)

(58) Field of Classification Search
CPC ........ E21B 47/14; E21B 49/003; E21B 49/00; Y02A 90/30; G01N 29/14; G01N 29/4427; G01V 1/00
See application file for complete search history.

(56) References Cited

U.S. PATENT DOCUMENTS

| 6,928,367 B2 * | 8/2005 | Gray ......................... G01V 1/30 367/56 |
| 9,027,668 B2 * | 5/2015 | Zediker ................... E21B 44/00 175/16 |

(Continued)

FOREIGN PATENT DOCUMENTS

| CN | 111537663 A | 8/2020 |
| CN | 112989708 A | 6/2021 |
| CN | 113297962 A | 8/2021 |

*Primary Examiner* — Amine Benlagsir
(74) *Attorney, Agent, or Firm* — Nitin Kaushik

(57) ABSTRACT

The present disclosure relates to the technical field of acoustic detection while drilling, in particular to a method and a device for identifying near-bit lithology based on intelligent voiceprint identification, including acquiring rock sound data; pre-processing the acquired rock sound data; extracting voiceprint features of pretreated rock sounds; establishing a rock voiceprint feature database; training the intelligent voiceprint identification algorithms according to the lithology labels and voiceprint feature data in the rock voiceprint feature database; intelligently identifying or predicting the rock voiceprint features using the intelligent voiceprint identification algorithms and outputting the lithology identification results. The present disclosure can greatly enhance the real-time availability and accuracy of obtaining near-bit stratum lithology data in-site, which can effectively improve the reservoir drilling rate and timely avoid drilling risks.

9 Claims, 20 Drawing Sheets

(56) References Cited

U.S. PATENT DOCUMENTS

| | | | | |
|---|---|---|---|---|
| 9,089,928 B2* | 7/2015 | Zediker | | B23K 26/0096 |
| 9,138,786 B2* | 9/2015 | McKay | | B08B 9/055 |
| 9,244,235 B2* | 1/2016 | Norton | | G02B 6/3897 |
| 9,562,395 B2* | 2/2017 | Grubb | | E21B 7/14 |
| 9,669,492 B2* | 6/2017 | Linyaev | | B23K 26/38 |
| 2015/0362623 A1* | 12/2015 | Miotti | | G01V 11/00 |
| | | | | 702/14 |
| 2019/0302290 A1* | 10/2019 | Alwon | | G01V 1/364 |
| 2019/0383965 A1* | 12/2019 | Salman | | G01V 1/36 |
| 2020/0190959 A1* | 6/2020 | Gooneratne | | E21B 17/02 |
| 2020/0278465 A1* | 9/2020 | Salman | | G01V 1/345 |
| 2025/0034994 A1* | 1/2025 | Yang | | G01V 1/325 |

\* cited by examiner

METHOD AND DEVICE FOR IDENTIFYING NEAR-BIT LITHOLOGY BASED ON INTELLIGENT VOICEPRINT IDENTIFICATION

CROSS-REFERENCE TO RELATED APPLICATIONS

The application claims priority to Chinese patent application No. 2023103777656, filed on Apr. 11, 2023, the entire contents of which are incorporated herein by reference.

TECHNICAL FIELD

The present disclosure relates to the field of acoustic detection while drilling, in particular to a method and a device for identifying near-bit lithology based on intelligent voiceprint identification.

BACKGROUND

To better guide the drilling direction of the drill bit in the drilling process, acoustic detection methods, such as acoustic logging while drilling and seismic while drilling, have been proposed to measure near the drill bit and to obtain stratum features more accurately and timely. Acoustic logging while drilling is to measure the longitudinal wave and transverse wave of the stratum at the same time of drilling to reduce the occupation time of the drilling rig at the well site and reduce the cost of drilling and logging service. The unique logging method can meet the requirements of horizontal wells, high-slope wells, and deep-water drilling. However, the structure of acoustic logging while drilling instrument is complex, which is generally composed of an acoustic transmitter, an acoustic insulator, a group of acoustic receivers, and a downhole circuit, especially the design of acoustic transmitters and acoustic insulator, whose performance directly affects the progress of acoustic logging while drilling technology and the success or failure of the R&D of acoustic logging while drilling instrument. In addition, according to the existing logging while drilling method, since the instrument is usually mounted on a drill stem more than 10 m away from the drill bit, the stratum detected by the logging while drilling method is a certain distance away from the drill bit, it is likely to cause the drill bit to deviate from the oil and gas reservoir, which has not been noticed by the drilling personnel, and this "hindsight" detection method may cause unnecessary trouble for oil and gas development. As a new method of seismic exploration, the research on drilling seismic technology started in the late 1980s. A drilling seismic profile was obtained by using the drill bit vibration recorded at the top of a drill string as a kind of coherent vibroseis technology. To obtain underground geological structure information, it is necessary to locate sensors at the top of the drill stem and surface geophones first. Next, the signals corresponding to the same depth range need to be correlated and superimposed. Several challenges exist when using seismic while drilling as a method of obtaining geological information. Firstly, when drilling soft rock, horizontal wells, or wells deeper than 6,000 meters, the seismic source signal intensity may be insufficient, leading to unreliable imaging results. Secondly, when using a PDC drilling bit, the weak axial vibration of the drill string makes the reference signal difficult to detect. Finally, developing an application model for seismic while drilling engineering and achieving real-time processing of data are challenging tasks.

In conclusion, the structure of the acoustic logging-while-drilling instrument is complex, and it has a limited range for measuring complex strata. Similarly, the seismic while drilling method has insufficient resolution and generates a large amount of data, which is not conducive to accurate and real-time analysis. Consequently, it is challenging to predict neat-bit strata information accurately and promptly using these two relatively similar acoustic measurement methods.

SUMMARY

It is an object of the present disclosure to provide a method and a device for identifying near-bit lithology based on intelligent voiceprint identification to solve the problems outlined in the background art.

In order to achieve the above object, the present disclosure provides the following scheme:

A method for identifying near-bit lithology based on intelligent voiceprint identification, including the following steps of:

S100: acquiring rock sound data;
S110: pre-processing the acquired rock sound data;
S120: extracting voiceprint features of the pre-processed rock sound;
S130: establishing a rock voiceprint feature database;
S140: training an intelligent voiceprint identification algorithm according to lithology labels and the rock voiceprint feature data in the rock voiceprint feature database; and
S150: carrying out intelligent lithology identification/prediction on the rock voiceprint features using an intelligent voiceprint identification algorithm, and outputting a lithology identification result.

Further, in step S100: acquiring the rock sound data generated by rock fracturing, hitting, or drilling, wherein the rock fracturing sound is obtained by recording a rock fracturing sound by a broadband microphone; obtaining the corresponding sound data of hitting and drilling by hitting or drilling a cubic rock, and acquiring same by a miniature piezoelectric transducer and an oscilloscope; the sound of the rock can also be obtained by other means, such as fracturing, scraping, shearing, etc.; various sound data of the rock can also be acquired through other recording methods/acquiring devices, such as borehole near-bit acoustic measurement instruments, surface broadband sound pressure/vibration sensors, drill string top driven sensors, surface/borehole geophones, hydrophones, etc. The rock sound data includes both conventional sound pressure data and three-component vibration data.

Further, in step S110, the rock sound data pre-processing mainly includes:

eliminating or correcting abnormal data in the sound data of the rock sample;
normalizing when there is a big difference for the amplitude values of similar rock sound data;
re-sampling when the sampling rates of the similar rock sounds are inconsistent; and
performing high-pass filtering, low-pass filtering or band-pass filtering on the acquired raw rock sound data for obtaining data with a high signal-to-noise ratio.

Further, in step S120: extracting voiceprint features of the pre-processed rock sound includes: inputting rock fracturing, hitting and drilling sounds; performing pre-emphasis, framing, and windowing; calculating an FFT amplitude spectrum and an energy spectrum, performing Mel-triangle filtering on the obtained energy spectrum; getting Napierian logarithms from the Mel-triangle filtered energy spectrum to obtain a logarithmic energy spectrum; performing discrete cosine transformation on the obtained logarithmic energy spectrum, and outputting the rock voiceprint features; in particular, in this step, other signal processing methods can also be used to obtain other types of rock voiceprint features, such as extracting a Power Normalized Cepstrum Coefficient, a Gammatone Frequency Cepstrum Coefficient and other rock voiceprint features through gamma pass filtering.

Further, in step S130: classifying and storing the rock sounds and final voiceprint data recorded by fracture, hitting, or drilling methods; marking the sound data of different types of rock with numeric symbols and storing same in the head of a corresponding voiceprint feature vector, wherein the marks are data labels; and recording simultaneously key information such as an instrument or equipment model, recording time, an acquisition method, a working environment, an operator, and parameters such as sampling rate and recording duration for each group of rock sound and voiceprint data.

Further, in step S140: dividing apart of the data of the voiceprint database into a rock voiceprint training data set and another part of the data into a rock voiceprint verification data set by a random algorithm, and performing model training and comparison testing by changing initial parameters of the AI algorithm, modifying filter parameters, changing input rock voiceprint feature data, and changing the length of a rock voiceprint feature vector to train and optimize the intelligent voiceprint identification algorithm.

In order to achieve the above object, the present disclosure further provides the following scheme:
a device for identifying near-bit lithology based on intelligent voiceprint identification, including:
an acquisition module used for acquiring rock sound data;
a processing module used for pre-processing the acquired rock sound data;
an extraction module used for extracting voiceprint features of the pre-processed rock sound;
a construction module used for establishing a rock voiceprint feature database;
a training module used for training an intelligent voiceprint identification algorithm according to lithology labels and the rock voiceprint feature data in the rock voiceprint feature database; and
an output module used for carrying out intelligent identification/prediction on the rock voiceprint features using an intelligent voiceprint identification algorithm, and outputting a lithology identification result.

In order to achieve the above object, the present disclosure further provides the following scheme:
a computer device including a memory and a processor, the memory storing a computer program which, executed by the processor, carries out the steps of the method according to any one of the preceding aspects.

In order to achieve the above object, the present disclosure further provides the following scheme:
a computer-readable storage medium having stored thereon a computer program, when executed by a processor, performs the steps of the method according to any one of the preceding aspects.

Compared with the prior art, the present disclosure has the beneficial effects that:

The present disclosure proposes near-bit lithology identification based on intelligent voiceprint identification: on one hand, according to the algorithm, as the algorithm uses the acoustic voiceprint features of rock obtained after mathematical transformations and other processing steps of the sound signal stimulated by the drill-bit to analyze the formation characteristics, the sound source or transmitting a transducer required by the conventional method can be eliminated, the mechanical and circuit structure of the near-bit acoustic instrument can be simplified and the manufacturing cost of the instrument can be reduced; on the other hand, because the extraction of the rock voiceprint feature parameters can be performed in the downhole near-bit instrument, only a very small amount of rock voiceprint feature data needs to be transmitted between the well bottom and the ground, so compared to traditional acoustic logging while drilling waveforms or volumes of seismic data while drilling, the data is reduced by 2 to 3 orders of magnitude. This significant reduction greatly improves the real-time capability of obtaining stratum lithology data on the surface, allowing for better and more timely avoidance of drilling risks. Ultimately, the present disclosure provides a new theoretical method and technical support for optimal drilling in complex reservoirs, faster drilling rates, and optimizing drilling processes. This method holds great scientific research significance and production application prospects.

DETAILED DESCRIPTION OF THE EMBODIMENTS

Figure 1:
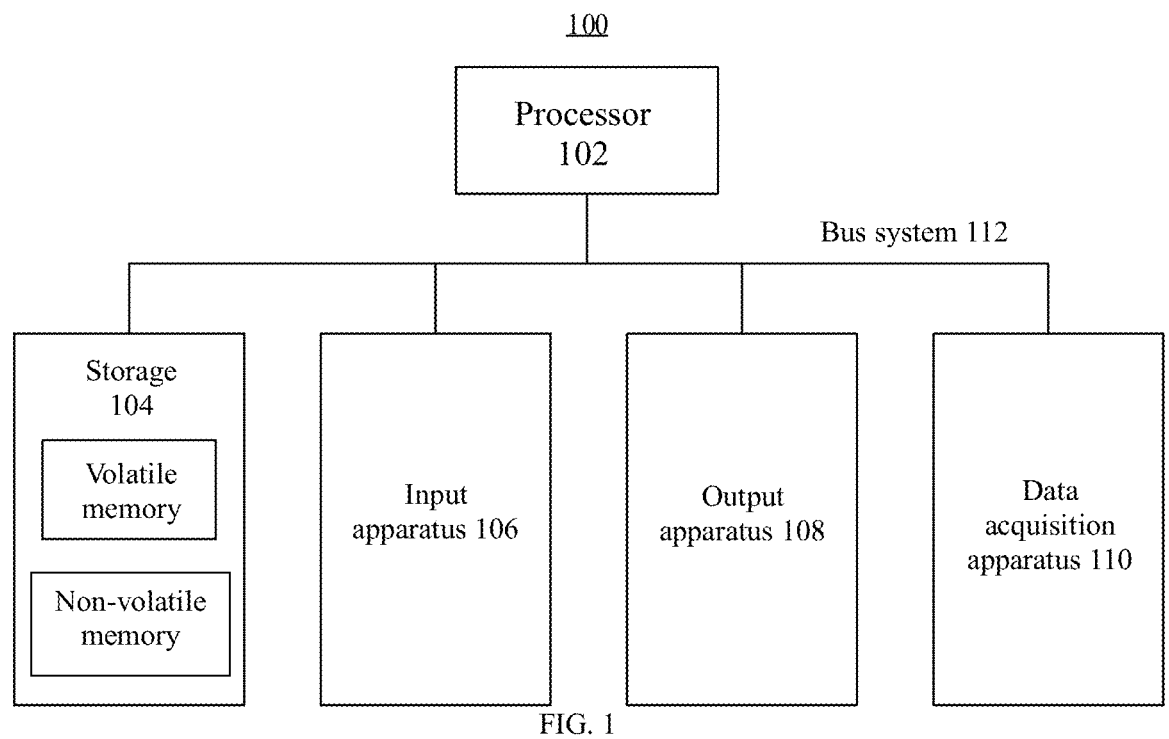
FIG. 1 is a schematic block diagram of exemplary electronics of the present disclosure for implementing a method and a device for identifying near-bit lithology based on intelligent voiceprint identification according to an embodiment of the present disclosure.

The embodiments of the present disclosure will now be described more fully hereinafter regarding the accompanying drawings, in which embodiments of the present disclosure are shown. It is to be understood that the embodiments described are only a few, but not all embodiments of the present disclosure. Based on the embodiments of the present disclosure, all other embodiments obtained by a person of ordinary skill in the art without inventive effort fall within the scope of the present disclosure.

In describing the present disclosure, the terms "upper end", "lower end", "inner", "outer", "front end", "rear end", "two ends", "one end", "the other end" and the like indicate orientations or positional relationships based on the orientation or positional relationships shown in the drawings, are merely for convenience in describing the present disclosure and to simplify the description, and do not indicate or imply that the devices or elements referred to must have a particular orientation, be constructed and operated in a particular orientation, and thus are not to be construed as limiting the present disclosure. Further, the terms "first" and "second" are used for descriptive purposes only and are not to be construed as indicating or implying relative importance.

In the description of the present disclosure, it should be noted that, unless expressly specified and limited otherwise, the terms "mounted", "provided", "sleeved", "sleeve connection", "connected", and the like, are to be construed broadly, e.g. "connected", either fixedly or detachably, or integrally; maybe a mechanical connection or an electrical connection; it can be directly connected or indirectly connected through an intermediate medium, and can be the communication between two elements. The specific meaning of the above terms in the present disclosure can be understood in detail by a person skilled in the art.

With reference to FIGS. 1 to 10, the present disclosure provides a technical solution:

an exemplary electronic device 100 for implementing a method and a device for identifying near-bit lithology based on intelligent voiceprint identification according to an embodiment of the present disclosure is described with reference to FIG. 1.

As shown in FIG. 1, the electronic device 100 includes one or more processors 102, and one or more storages 104. Optionally, the electronic device 100 may include an input device 106, an output device 108, and a data acquisition device 110, which are interconnected via a bus system 112 and/or other forms of connection mechanisms (not shown). The components and configurations of the electronic device 100 shown in FIG. 1 are merely exemplary and not limiting, and the electronic device may have other components and configurations as desired.

The processor 102 may be a central processing unit (CPU), a graphics processor (GPU), or another form of processing unit having data processing capabilities and/or instruction execution capabilities, and may control other components in the electronic device 100 to perform desired functions.

The storage 104 may include one or more computer program products, which may include various forms of computer-readable storage media, such as volatile memory and/or non-volatile memory. The volatile memory may for example include a random-access memory (RAM) and/or a cache memory (cache) etc. The non-volatile memory may include, for example, a read-only memory (ROM), a hard disk, a flash memory, etc. One or more computer program instructions may be stored on the computer-readable storage medium, and the processor 102 may execute the program instructions to perform the near-bit stratum detection function and/or other desired functions described below in embodiments of the present disclosure (implemented by the processor). Various applications and various data may also be stored in the computer-readable storage medium, such as various data used and/or generated by the applications, etc.

The input device 106 may be a device used by a user to input instructions and may include one or more of a keyboard, mouse, microphone, touch screen, and the like.

The output device 108 may output various information (e.g. images and/or sounds) to the outside (e.g. a user) and may include one or more of a display, a speaker, etc.

The data acquisition device 110 may acquire various forms of data, such as images, and store the acquired data in the storage 104 for use by other components. The data acquisition device 110 may be a camera or the like. The data acquisition apparatus 110 is merely an example and the electronic device 100 may not include the data acquisition apparatus 110. In this case, the data may be acquired using other data acquisition means and transmitted to the electronic device 100.

Illustratively, the example electronic devices for implementing near-bit stratum detection methods and apparatus based on acoustic-while-drilling front-end view according to an embodiment of the present disclosure may be implemented on the devices such as personal computers or remote servers.

Figure 2:
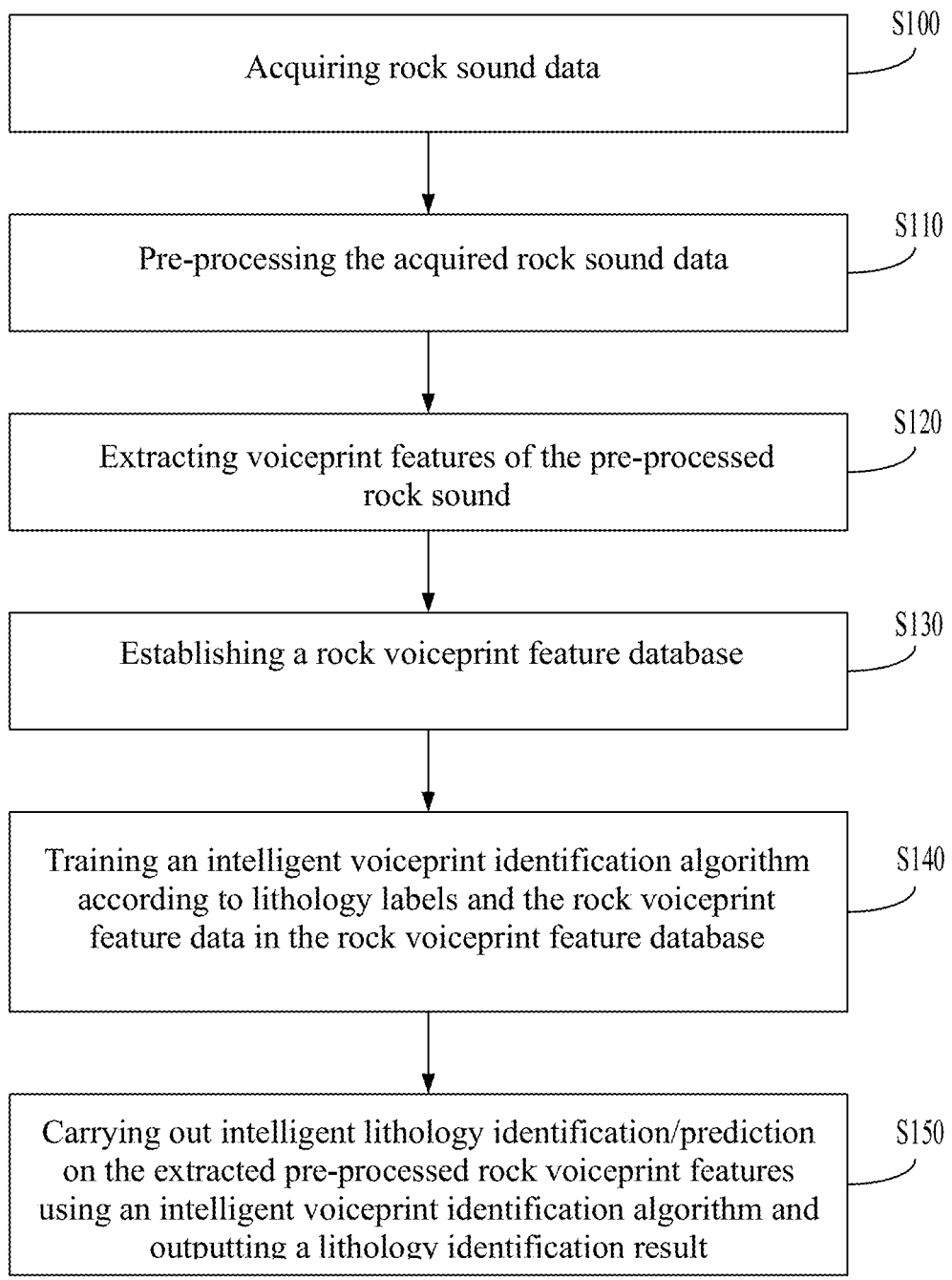
FIG. 2 is a schematic flow diagram of a method for identifying near-bit lithology based on intelligent voiceprint identification according to an embodiment of the present disclosure.

Next, a method for identifying near-bit lithology based on intelligent voiceprint identification according to an embodiment of the present disclosure will be described with reference to FIG. 2. FIG. 2 shows a schematic flow diagram of near-bit lithology identification based on intelligent voiceprint identification according to an embodiment of the present disclosure. As shown in FIG. 2, the method includes the following steps:

S100: acquiring rock sound data;
S110: pre-processing the acquired rock sound data;
S120: extracting voiceprint features of the pre-processed rock sound;
S130: establishing a rock voiceprint feature database;
S140: training an intelligent voiceprint identification algorithm according to lithology labels and the rock voiceprint feature data in the rock voiceprint feature database; and
S150: carrying out intelligent lithology identification/prediction on the rock voiceprint features using an intelligent voiceprint identification algorithm, and outputting a lithology identification result.

The following is a detailed introduction:

with the deepening of oil and gas exploration and development and the rapid development of wireless transmission technology, the drilling technology has entered the digital and intelligent era, so it is hoped to know more accurately and timely the conditions, stratum structure, and rock characteristics. At the same time, the extensive application and improvement of a large data, artificial intelligence algorithm, and the voiceprint identification technology provide a new idea for the development of new-generation monitoring while drilling technology. In view of the different features of the sound generated by the interaction between the drill bit and the underground strata of different lithology in the process of oil drilling, the voiceprint features of the sound and vibration signals generated by the rock fracturing of the drill bit acquired near the drill bit (i.e., "rock voiceprint"), through referring a principle of voiceprint identification technology and improving the intelligent pattern identification algorithm, can achieve intelligent prediction of the stratum lithology near the drill bit.

The method for identifying near-bit lithology provided by the present disclosure has two major competitive advantages: (1) the complicated structure such as an acoustic transmitting transducer and an acoustic isolator is eliminated, and the acoustic receiving transducer only needs to be mounted in the measuring nipple near the drill bit, which greatly simplifies the acoustic measurement while drilling; (2) the amount of rock voiceprint data that needs to be acquired is small (if only the voiceprint feature parameters are transmitted to the surface processing center, the amount of data will be reduced by a factor), which facilitates the data transmission between the well and the ground, facilitates the real-time near-bit monitoring, and can largely avoid the occurrence of "hindsight".

Figure 4A:
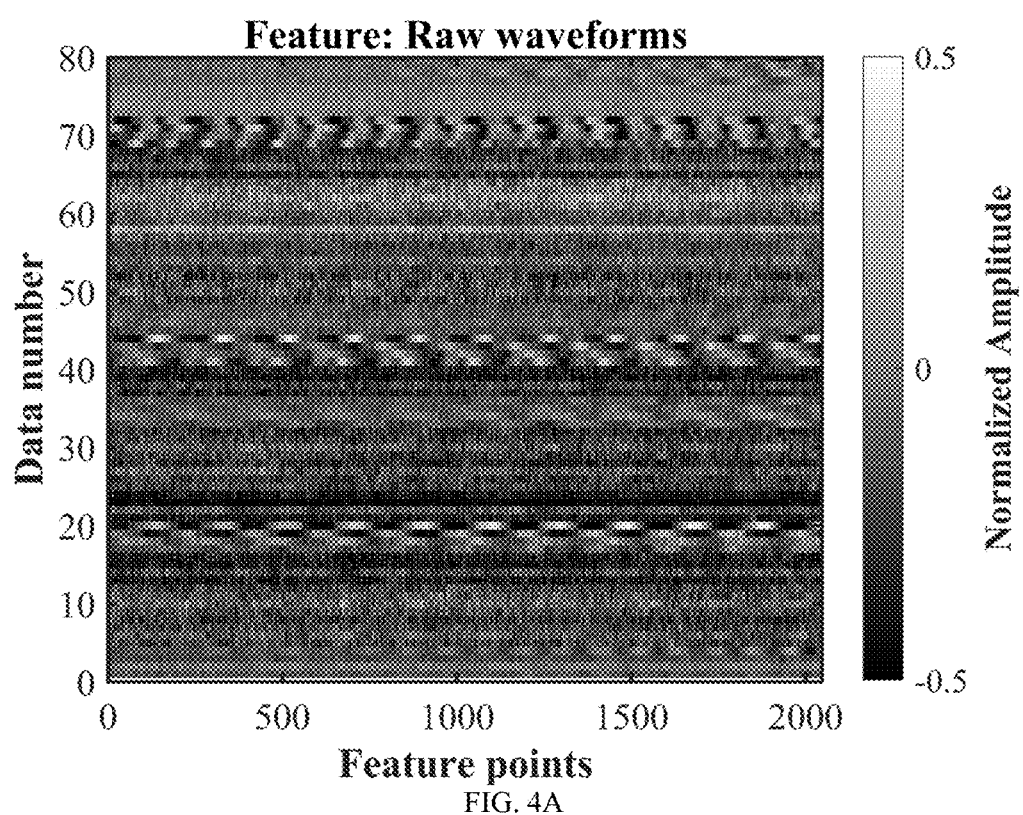
FIG. 4A, FIG. 4B and FIG. 4C are graphs of drilling sound raw waveform data for the three rock samples acquired by a laboratory according to an embodiment of the present disclosure.
Figure 4B:
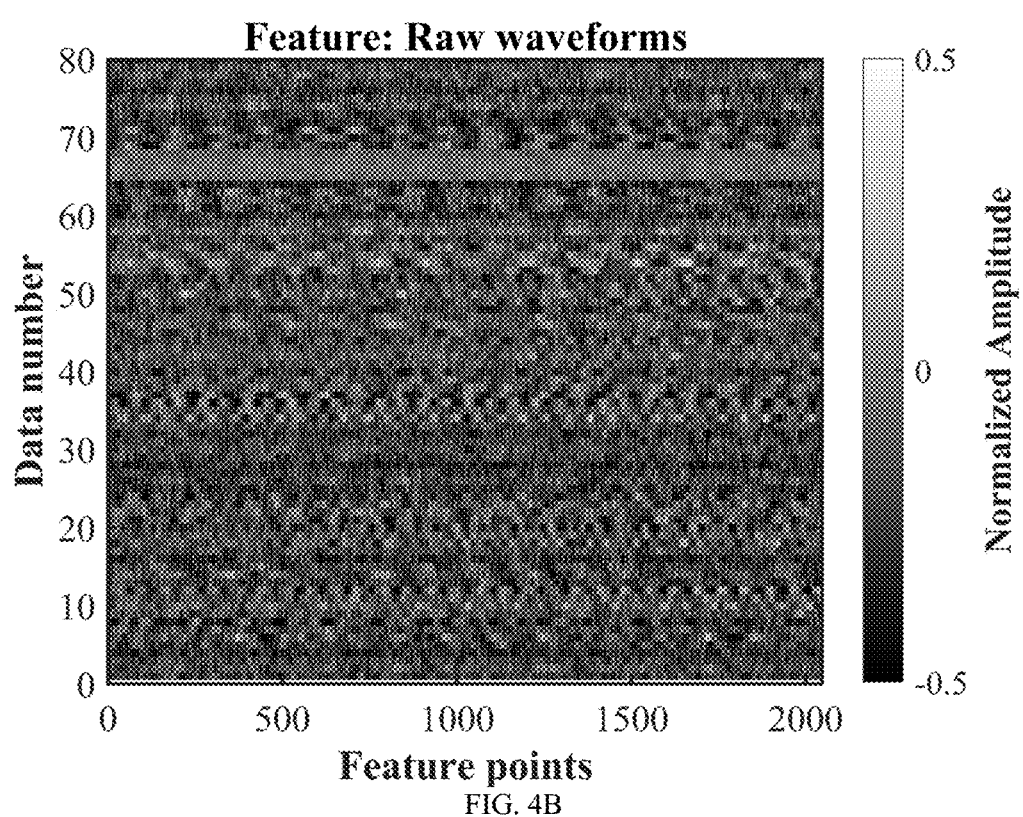
Figure 4C:
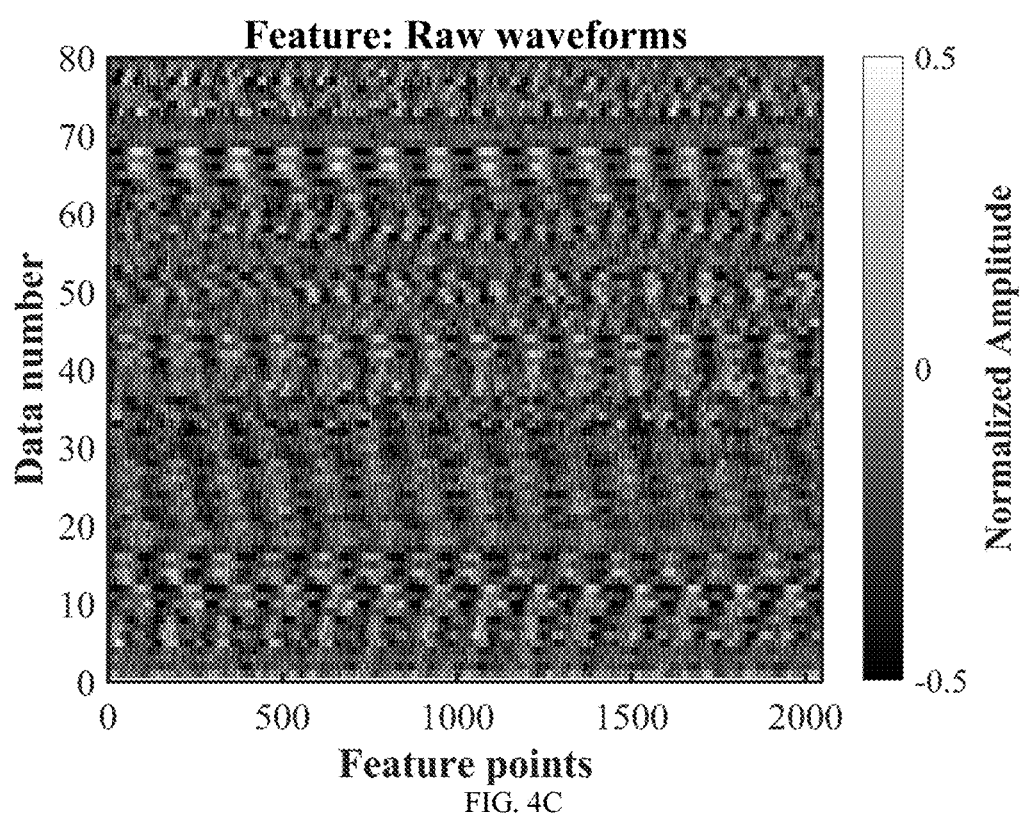

FIG. 4A, FIG. 4B, and FIG. 4C show raw waveform data of drilling sound of three rock samples acquired by a laboratory; the horizontal axis represents time, the vertical axis represents data number, and there are 80 groups for each rock sample.

Figure 5A:
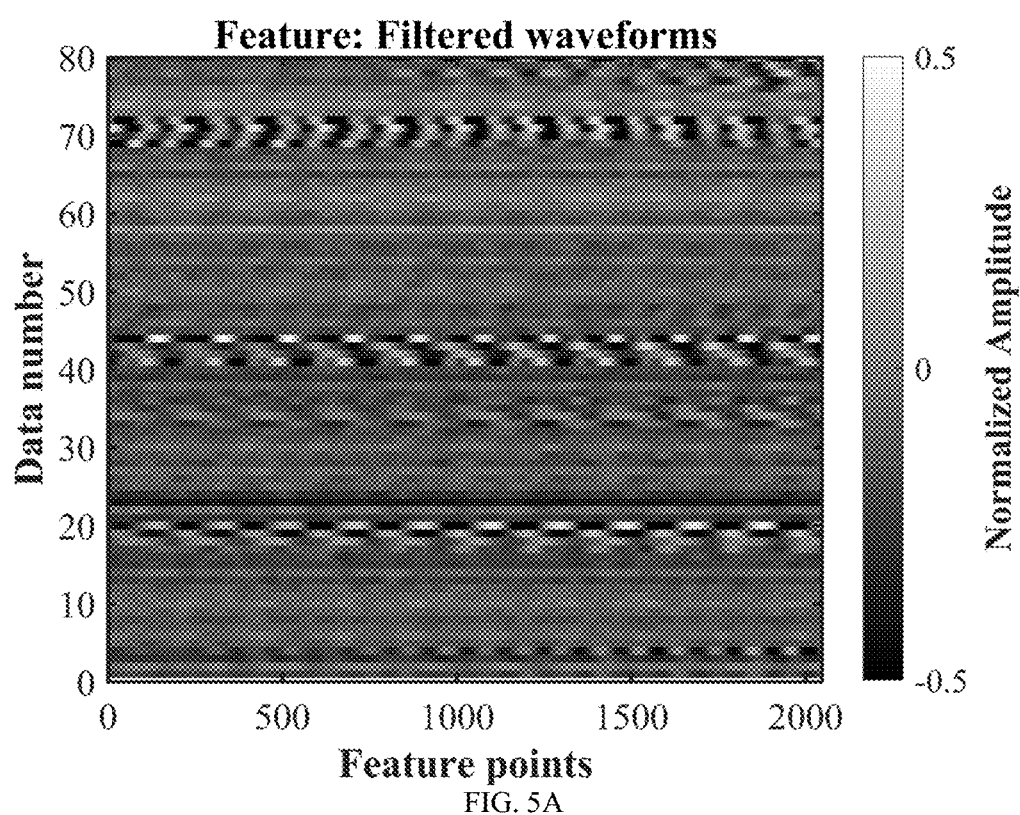
FIG. 5A, FIG. 5B and FIG. 5C are graphs of filtered waveform data of drilling sounds from the three types of rock samples acquired by a laboratory according to an embodiment of the present disclosure.
Figure 5B:
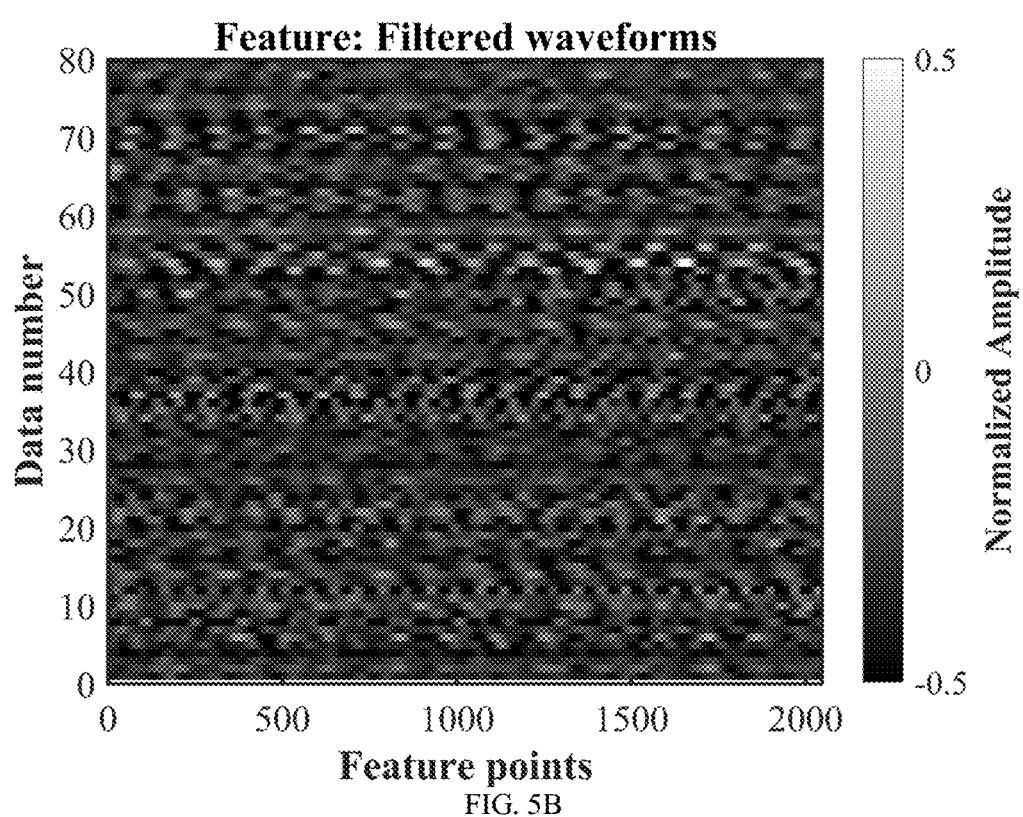
Figure 5C:
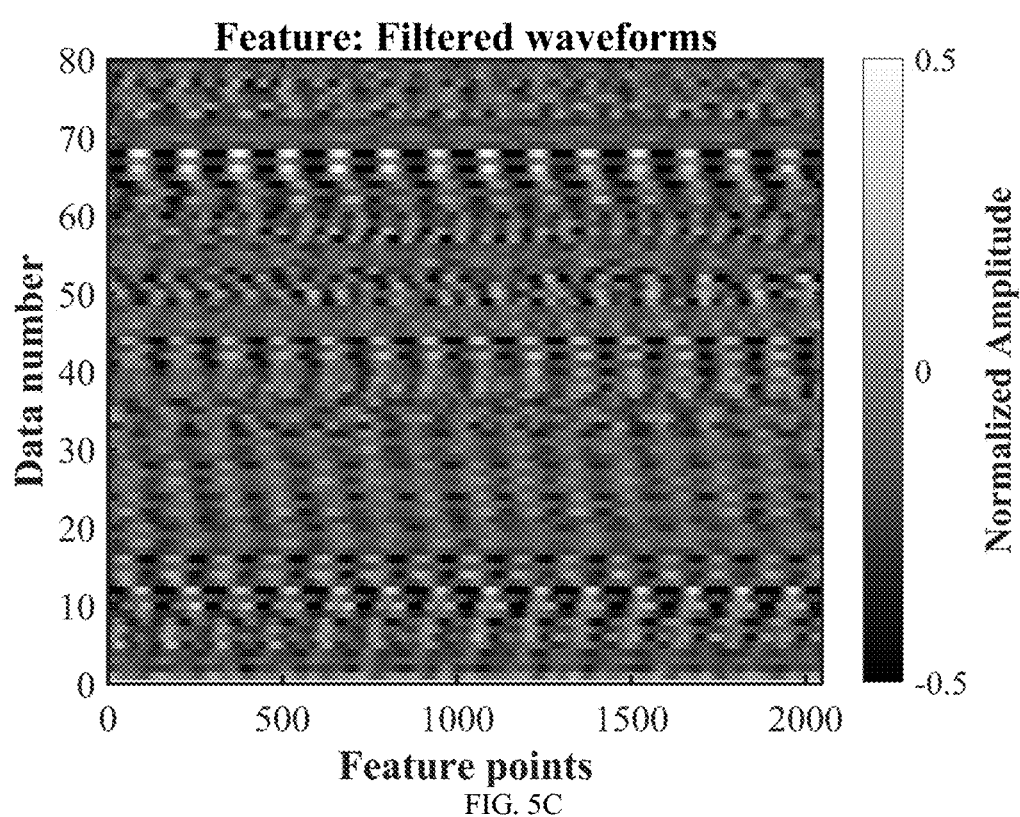

FIG. 5A, FIG. 5B, and FIG. 5C show waveform data of filtered drilling sounds of three rock samples acquired by a laboratory; the horizontal axis represents time, the vertical axis represents data number, and there are 80 groups for each rock sample.

Figure 6A:
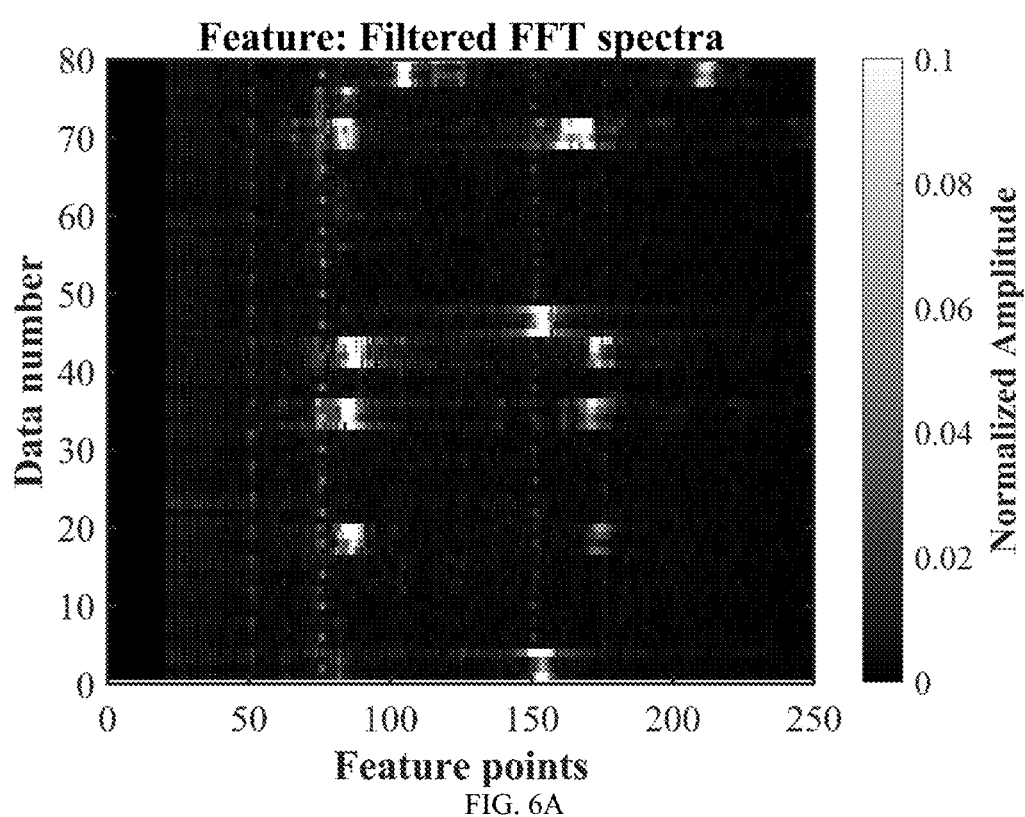
FIG. 6A, FIG. 6B and FIG. 6C are voiceprint feature parameters-FFT spectra extracted after drilling sound filtering of the three types of rock samples acquired by a laboratory according to an embodiment of the present disclosure.
Figure 6B:
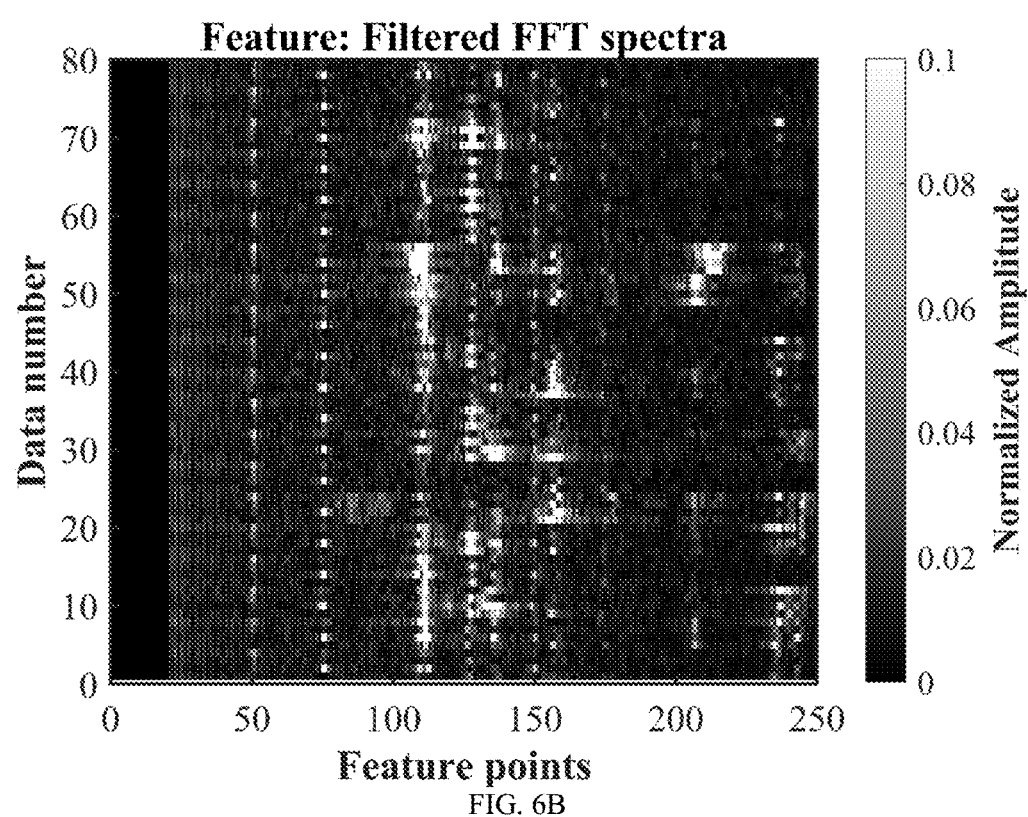
Figure 6C:
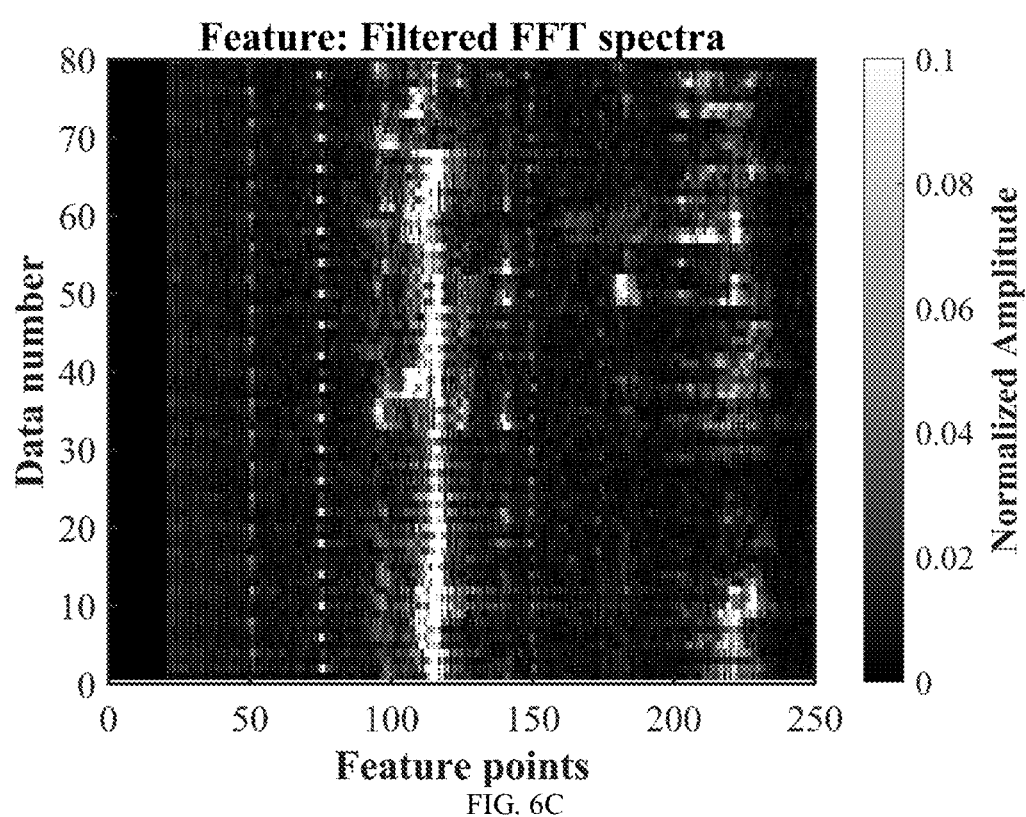

FIG. 6A, FIG. 6B, and FIG. 6C show graphs of voiceprint feature parameter-amplitude spectrum extracted after drilling sound filtering of three types of rock samples acquired by a laboratory; the horizontal axis represents frequency points, the vertical axis represents data number, and there are 80 groups for each rock sample.

Figure 7A:
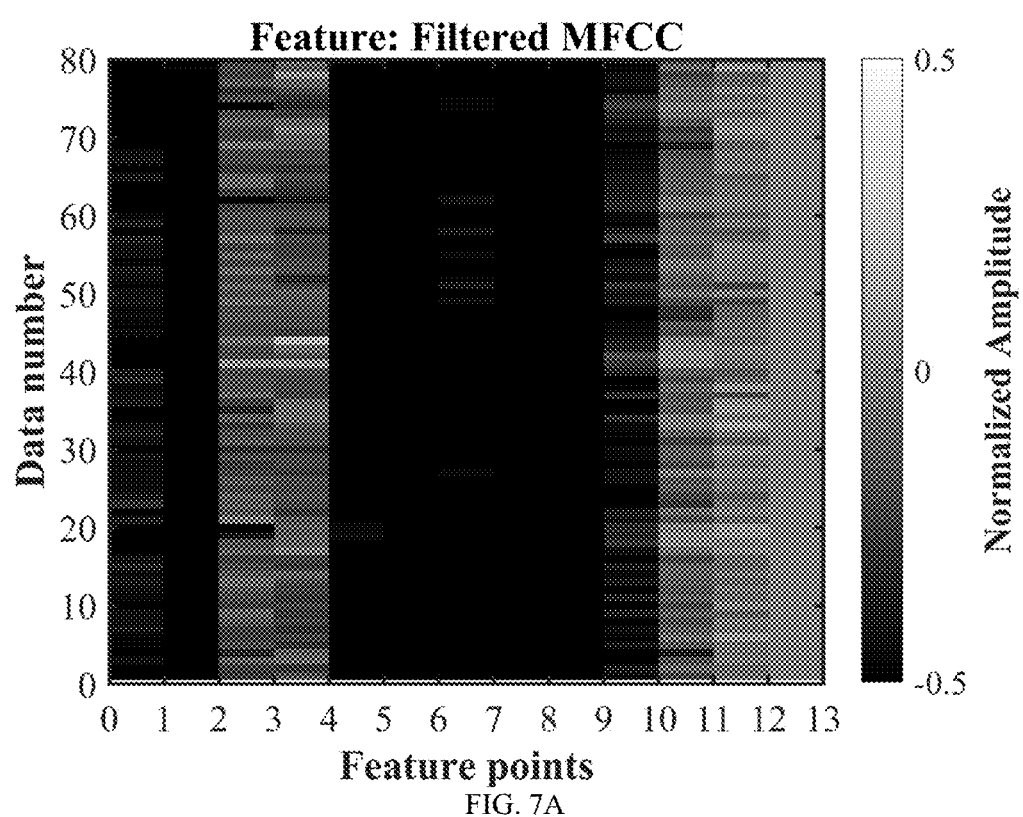
FIG. 7A, FIG. 7B and FIG. 7C are voiceprint feature parameters-MFCC extracted after drilling sound filtering of the three types of rock samples acquired by a laboratory according to an embodiment of the present disclosure.
Figure 7B:
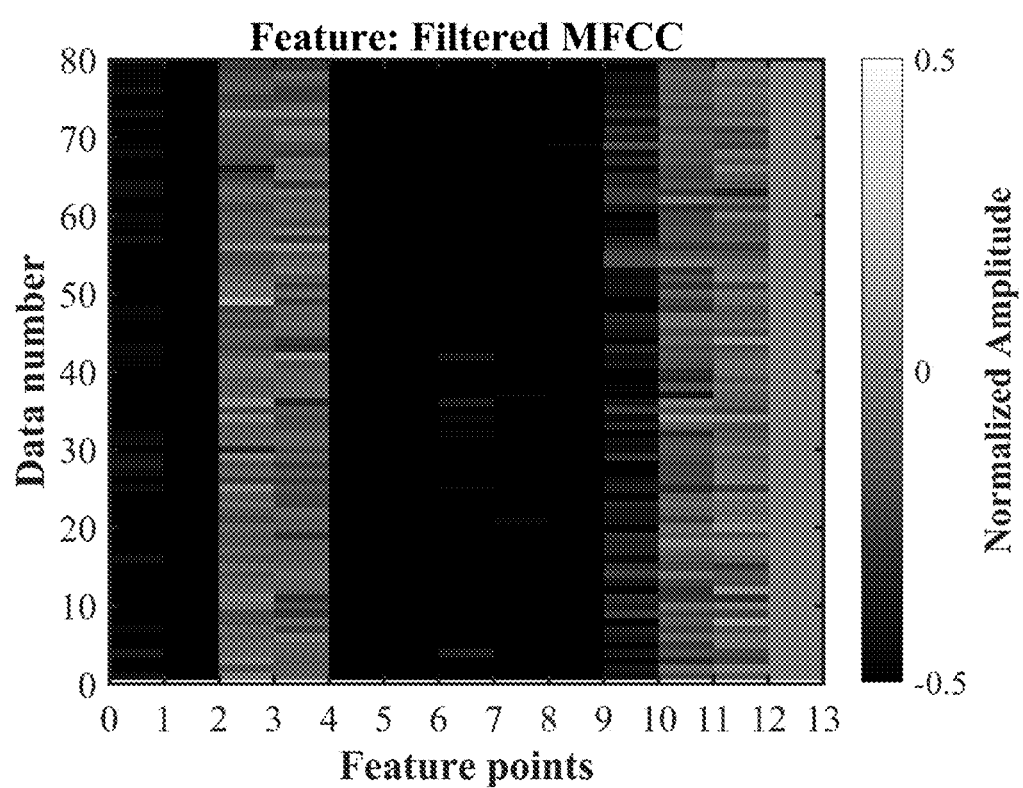
Figure 7C:
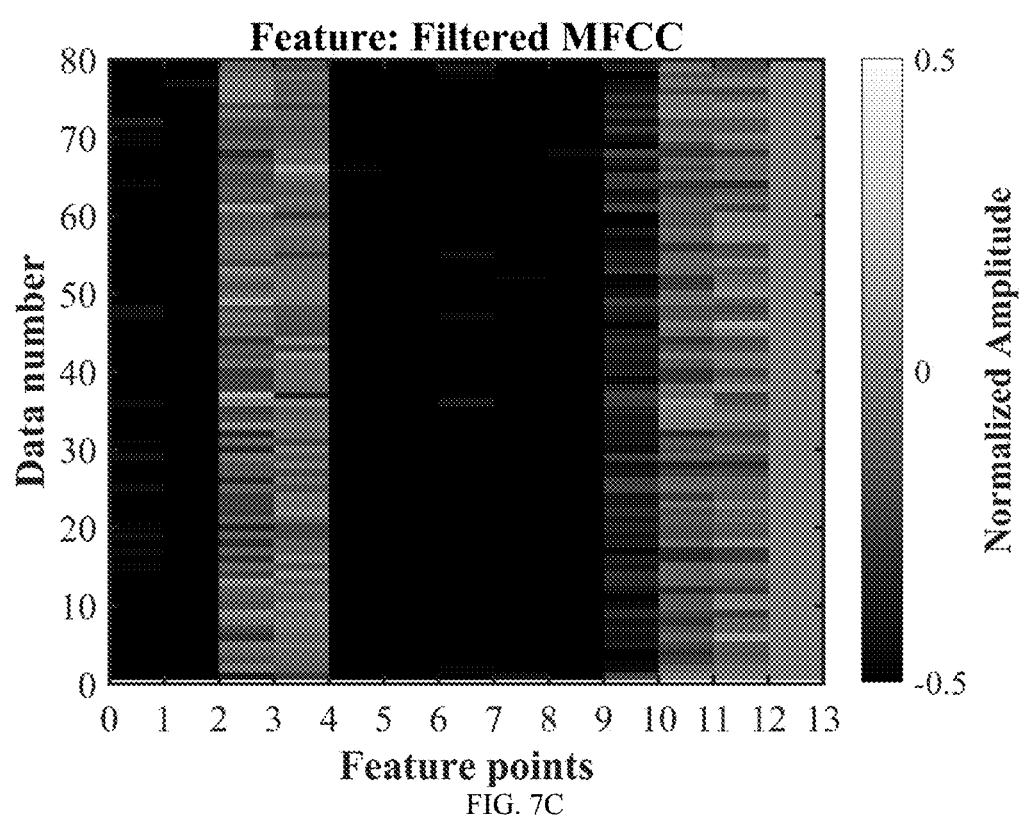

FIG. 7A, FIG. 7B, and FIG. 7C show graphs of voiceprint feature parameter-MFCC extracted after drilling sound filtering of three types of rock samples acquired by a laboratory; the horizontal axis represents the number of feature points, the vertical axis represents the number of data, and there are 80 groups for each rock sample.

Figure 8A:
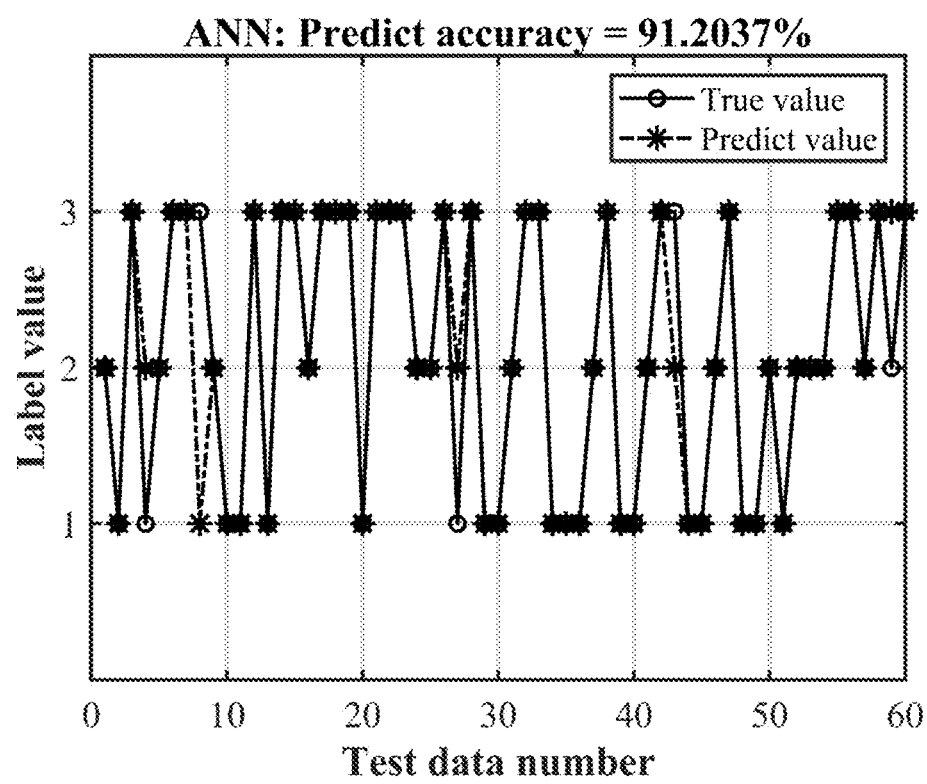
FIG. 8A and FIG. 8B are graphs comparing the results of intelligent lithology identification using a BP neural network algorithm based on the two voiceprint feature parameters, FFT spectra and MFCC of rock drilling sounds acquired by a laboratory according to an embodiment of the present disclosure.
Figure 8B:
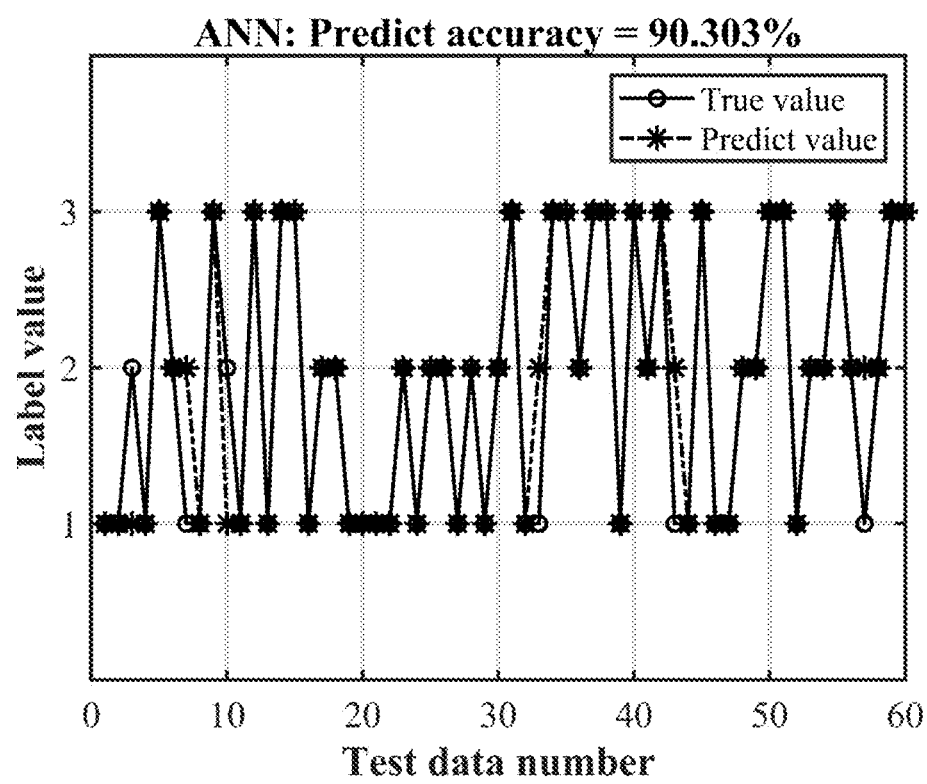

FIG. 8A, and FIG. 8B show graphs comparing the predicted label value and the real label value obtained by using BP neural network algorithm for intelligent lithology identification based on the amplitude spectrum and MFCC of the rock drilling sound acquired by a laboratory. The horizontal axis represents a data number, the vertical axis is a data label, the number 1 in the vertical axis represents sandstone, the number 2 represents limestone, and the number 3 represents granite; small circles connected by solid lines represent accurate data label values, while asterisks connected by dashed lines represent data label values predicted by the BP neural network algorithm.

Figure 9A:
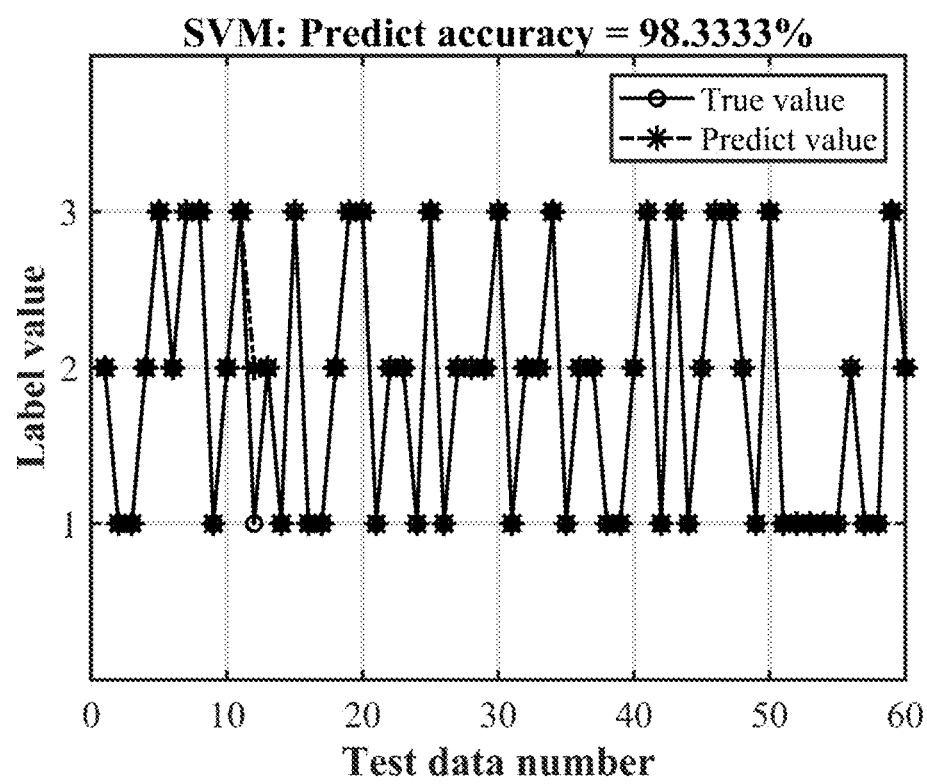
FIG. 9A and FIG. 9B are graphs comparing the results of intelligent lithology identification using SVM algorithm based on the two voiceprint feature parameters, FFT spectra and MFCC of rock drilling sounds acquired by a laboratory according to another embodiment of the present disclosure.
Figure 9B:
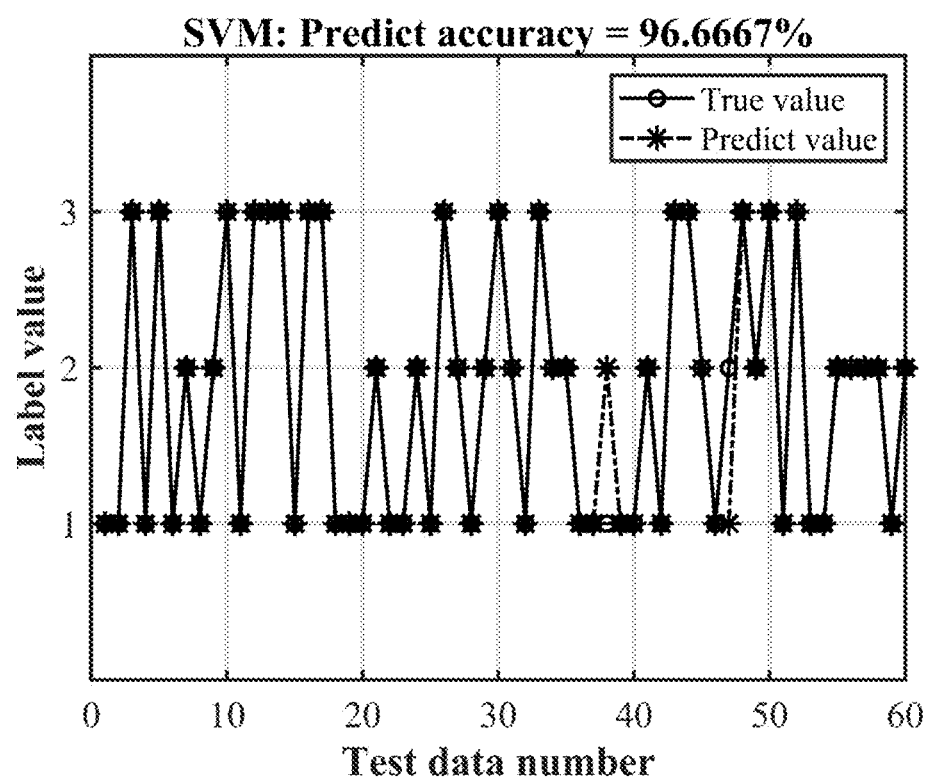

FIG. 9A and FIG. 9B are graphs comparing the predicted label value and the real label value obtained by using SVM algorithm for intelligent lithology identification based on the amplitude spectrum and MFCC of the rock drilling sound acquired by a laboratory. The horizontal axis represents a data number, the vertical axis is a data label, the number 1 in the vertical axis represents sandstone, the number 2 represents limestone, and the number 3 represents granite; small circles connected by solid lines represent accurate data label values, while asterisks connected by dashed lines represent data label values predicted by the SVM algorithm.

Aiming at the problems of a complex structure of existing measurement while drilling instruments, large amount of data transmitted between a well and the ground, and difficulty in identifying the lithology of near-bit in real-time, an identification method of lithology of near-bit based on the intelligent voiceprint identification technology is proposed. According to the method, an acoustic emission transducer is not needed, the structure of acoustic while drilling instruments can be simplified, only less measurement data (equivalent to rock voiceprint feature data) needs to be transmitted, and the lithology of stratum encountered by bit in real-time is expected to be monitored. The overall technical solution of the present disclosure is shown in FIG. 2, and the specific implementation steps are described as follows.

1. Acquiring Rock Sound Data a rock drilling or drilling process is essentially a very complex rock fracturing process in which a drill bit impacts, crushes, grinds and cuts the rock. In order to collect abundant rock voiceprint feature data, physical experiments such as rock fracturing, hitting and drilling were carried out, and many rock voice data were recorded for subsequent rock voiceprint analysis. In a rock fracturing test, rectangular rocks with the size of 10 mm*10 mm*200 mm or other long strip-shaped or plate-shaped rock samples can be used, and fracturing sound data are recorded by a broadband microphone; in the hitting and drilling experiments, cubic rocks with the size of 300 mm*300 mm*300 mm or rocks with other sizes and other shapes can be used, and the corresponding sound data is acquired by a miniature piezoelectric acoustic transducer and an oscilloscope. The method of the present disclosure is also applicable to analysis of acoustic data generated from other sizes and types of rock, however, in order to obtain rock sound data with a higher signal-to-noise ratio, tapping and drilling experiments should be performed using rock samples of as large a size as possible. The rock sample types include, but are not limited to, sandstone, limestone, granite, shale, coal rock, metamorphic rock, and the like. The sound of the rock can also be obtained by other means, such as fracturing, scraping, shearing, etc.; various sound data of the rock can also be acquired through other recording methods/acquiring devices, such as borehole near-bit acoustic measurement instruments, surface broadband sound pressure/vibration sensors, drill string top driven sensors, surface/borehole geophones, hydrophones, etc. The rock sound data referred to herein includes both conventional sound pressure data and three-component vibration data.

2. Rock Sound Data Pre-Processing

The pre-processing of rock sound data mainly includes the main steps of data cleaning, normalization, re-sampling, denoising, and the like. In order to establish a rock voiceprint database of a certain scale, many sound data of different types and different sizes of rock samples are needed. These data will generate a small amount of abnormal data due to the failure of instruments and equipment or non-standard parameter settings. Therefore, such data need to be eliminated or corrected to avoid entering the database, which is also called data cleaning. The sampling rate of data acquired by different equipment or different batches may be inconsistent. It is preferable to resample the data to ensure that the sampling rate of sound data of the same type is consistent. At the same time, when considering different rock samples, different instruments, or different personnel's operations, the amplitude values of similar rock sound data are different, it is necessary to normalize to avoid affecting the prediction accuracy of the algorithm. In addition, high-pass filtering, low-pass filtering, low-pass filtering, band-pass filtering, and other processing means to the raw rock sound data acquired by the instrument to obtain data with a relatively high signal-to-noise ratio because various noise interferences cannot be avoided in the experimental environment or drilling site. For some raw rock sound data with a high signal-to-noise ratio, a good lithology identification effect can be obtained without filtering.

3. Extracting Rock Voiceprint Features

The acoustic signal generated in the drilling process is very complex, so it is difficult to distinguish the lithology from the waveform features in a time domain. Therefore, it is proposed to use the feature parameters of rock voiceprint, such as the amplitude spectrum of Fast Fourier Transform (FFT) and Mel Frequency Cepstrum Coefficient (MFCC) of rock sound data to identify rock features. The FFT amplitude spectrum is the reflection of rock sound features in the frequency domain, while the MFCC are the mapping of rock sound features in a cepstrum domain. The rock voiceprint feature parameters are extracted as follows:

Step 1: selecting the rock voiceprint features. Common rock voiceprint feature parameters include but are not limited to, the FFT amplitude spectrum and MFCC. When calculating the FFT amplitude spectrum, it is necessary to intercept sound data of a specified length (usually nth power of 2, such as 128, 256) and use the FFT algorithm to calculate its amplitude spectrum, and then store an appropriate number of spectral data (such as 200 data points) for voiceprint identification. Since FFT analysis is a conventional means in the field of signal analysis, it is not described in detail herein.

Figure 3:
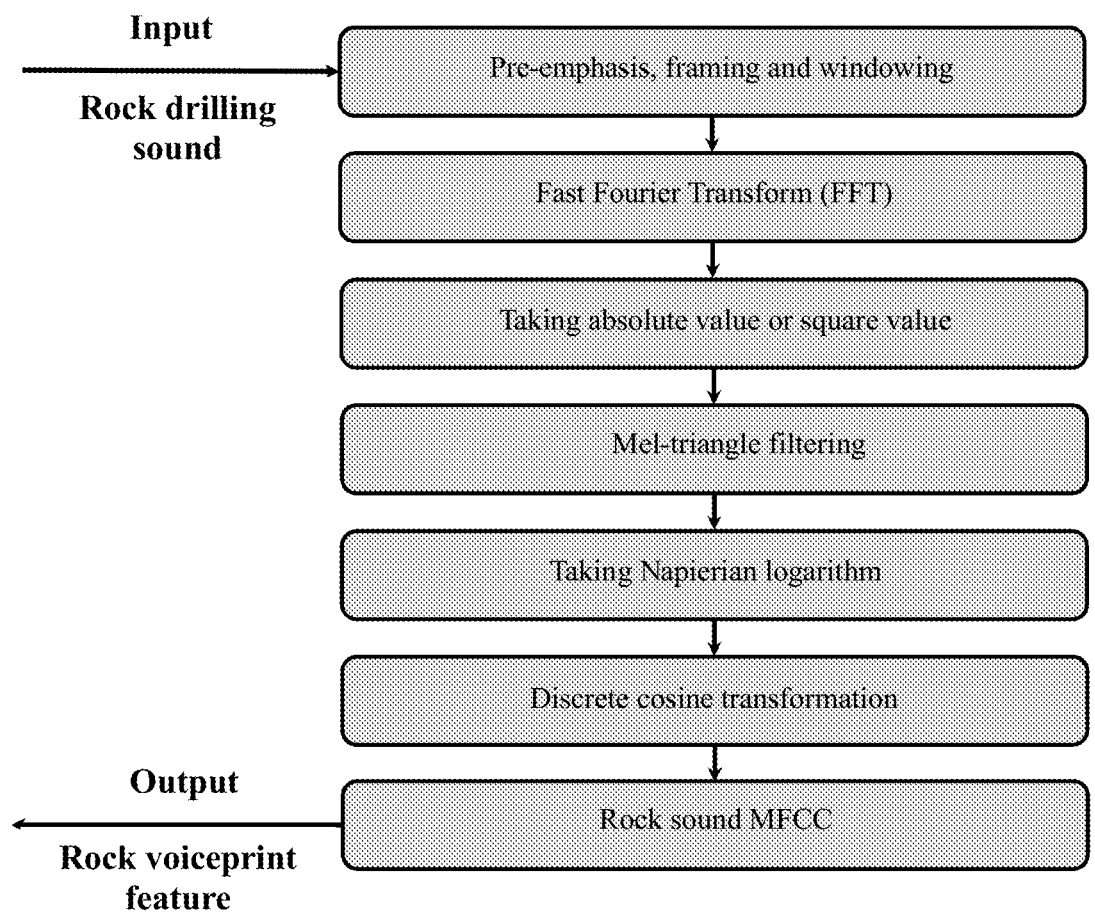
FIG. 3 is a flow diagram of a method for extracting the rock voiceprint feature parameter-MFCC according to an embodiment of the present disclosure.

The steps of MFCC are shown in FIG. 3, and specifically include the calculation steps of rock sound data pre-processing (including pre-emphasis, framing, and windowing, etc.), an FFT operation to calculate amplitude spectrum, an energy of amplitude spectrum, Mel-triangle filtering, a Napierian logarithm operation, and discrete cosine transformation, etc. In general, the number of data points of MFCC is 13, 26, or 39; other data points may be used. FIG. 2 only shows the process of extracting the MFCC. If the AI algorithm uses other rock voiceprint feature parameters, such as Complex Cepstrum Coefficient, Linear Prediction Cepstrum Coefficient (LPCC), Buck Frequency Cepstrum Coefficient and Power Normalized Cepstrum Coefficient, the above calculation flow shall be modified and updated accordingly.

Step 2: pre-emphasis. In the process of rock sound data recording, on one hand, the energy of the low-frequency sound signal is relatively strong because the high-frequency sound signal attenuates faster than the low-frequency sound signal in the process of propagation; on the other hand, various noises of the working environment are inevitable; in this case, the effective high-frequency signals in the acquired rock sound data are easily overwhelmed. By pre-emphasis processing, the high-frequency components of rock sound data can be effectively enhanced, and the frequency distribution of rock sound can be more balanced. The pre-emphasis method includes digital high-pass filtering and other signal processing means. In some special cases, it is sometimes necessary to de-emphasize the rock sound signal, i.e., suppress the high-frequency components of the sound signal to improve the accuracy of the sound signal identification.

Step 3: framing and windowing. Different from the application of speech identification, the frequency distribution of rock sound signals with different lithology is quite different. Therefore, special attention should be paid to the selection of signal frame length when framing is performed to avoid missing the feature frequency information of common rocks and ensure that the signals are stable. In addition, different ways of acquiring rock sound data will also lead to different parameters of framing. For example, for a rock fracturing sound, the length of a frame signal can be selected to be about 100 ms; for rock hitting or drilling sounds, the length of one frame signal can be chosen around 5 ms. For rock sound data acquired by a laboratory or on-site real drilling, each piece of sound data only needs to intercept a frame of signal for training or prediction analysis, and does not need to set the frameshift size. If the actual application requires, a corresponding frameshift can also be defined according to a specific application scenario, and the size of the frame shift usually takes a value of ¼ to ½ of the frame length. Further, before FFT, to make the truncated signal more like a periodic signal to reduce spectral leakage, a window function needs to be applied to the sound signal as described above. The results show that the application effect of a Hamming window or a Hanning window is relatively good. Other window functions with similar effects can be used, such as a Blackman window.

Step 4: FFT amplitude spectrum and energy spectrum calculations. When calculating the FFT amplitude spectrum of a rock sound signal, firstly, the pre-processed rock sound signal should be zero-padded so that its length is an integer power of 2, and as small as 128, 256, etc. The amplitude spectrum of the sound signal is then obtained using the standard FFT algorithm. The energy spectrum of the rock sound signal amplitude spectrum can be calculated by taking absolute values or squaring.

Step 5: Mel-triangle filtering. In order to highlight the formant of the rock sound, the energy spectrum from the previous step needs to be passed through a set of triangular filters to ensure that the timbre in the sound is extracted into the MFCC. One transfer function $H_m(k)$ of a triangular band-pass filter bank can be described by the following formula:

$$H_m(k) = \begin{cases} 0, & k < f(m-1) \\ \dfrac{k - f(m-1)}{f(m) - f(m-1)}, & f(m-1) \leq k \leq f(m) \\ \dfrac{f(m+1) - k}{f(m+1) - f(m)}, & f(m) \leq k \leq f(m+1) \\ 0, & k < f(m-1) \end{cases} \quad (1)$$

In the above equation, m is the number of triangular filters, M is the total number of triangular filters, and k is an input frequency of the triangular filters; $1 \leq m \leq M$, M is typically between 24 and 40; f(m) is a center frequency of the triangular filter, as m increases, the interval between two adjacent f(m) becomes larger.

Step 6: taking Napierian logarithm. The logarithmic energy spectrum P(m) is obtained by taking the logarithm of the base of the natural constant e for the energy spectrum after Mel-triangle filtering.

Step 7: discrete cosine transformation. Performing a discrete cosine transformation on the energy spectrum obtained in the previous step, and the calculation method can be represented by the following formula:

$$c(n) = \sum_{m=1}^{M-1} \left\{ P(m) \cos\left[\frac{\pi n(m + 0.5)}{M}\right] \right\} \quad (2)$$

Static/zeroth order MFCC c(n) can be obtained by the discrete cosine transformation described above. On this basis, the first and second-order MFCC can be obtained by making a difference of order or second order for the zeroth order MFCC. When 26 triangular filters are used, each order of MFCC is 13, i.e., a total of 39 feature parameters. In the actual lithology identification, only the zero-order MFCC can be input, or all the order MFCC can be input. c(n) is a static or zero order MFCC obtained through mathematical operation, and in practical applications, the parameters, such as the total number of triangular filters and the center frequency, can be adjusted to meet the requirements of processing rock sound data.

4. Establishing a Rock Voiceprint Feature Database

When building the rock voiceprint database, it is necessary to classify to store the rock voiceprint data and the final voiceprint data recorded in different ways, such as fracture, hitting, drilling, scraping, fracturing, and shearing, etc. by means of file folders or file names.

The sound data of different types of rocks is marked with special numerical symbols, such as sandstone marked with the number 1, limestone marked with the number 2, etc. and is stored at the head of the corresponding voiceprint feature vector, and such marks are data labels. The fluid-bearing properties of the rock, such as the presence of different fluids such as oil, gas, and water, can also be marked accordingly. With regard to drilling experimental data, it is also necessary to mark drilling experimental parameters (such as drilling pressure, torque, rotation speed, etc.).

In addition, it is also necessary to synchronously record the key information such as instrument/equipment model, recording time, acquisition method, working environment and operator used for each group of rock sound, and voiceprint data as well as the important parameters such as sampling rate and recording duration.

The rock voiceprint database should contain the typical lithology of the target work area, including but not limited to sandstone, limestone, granite, shale, coal rock, metamorphic rock, etc.

5. Intelligent Voiceprint Identification Algorithm Training

Before artificial intelligence (AI) algorithm training, one part of the data in the voiceprint database can be divided into a rock voiceprint training data set and another part into a rock voiceprint verification data set by a random algorithm, and the ratio between them can be 4:1, 3:1, or other reasonable ratios. When training the voiceprint identification algorithm, a lot of model training and comparison tests can be done by changing the initial parameters of the AI algorithm, modifying the filter parameters, changing the input rock voiceprint feature data (such as FFT amplitude spectrum and MFCC) and changing the length of rock voiceprint feature vector to achieve the purpose of optimizing the intelligent voiceprint identification model. The AI algorithm used in the method of the present disclosure can be a classical intelligent pattern identification algorithm such as an artificial neural network (ANN), a support vector machine (SVM), a random forest, a decision tree, etc. and can also be a newly developed AI voiceprint identification algorithm such as a convolution neural network, an in-depth learning, a migration learning, federal learning, etc. In a specific implementation, not only a single intelligent voiceprint identification algorithm can be used for lithology prediction, but also a variety of intelligent voiceprint identification algorithms can be used to build a comprehensive rock voiceprint identification system.

6. Intelligent Lithology Prediction

After optimizing the AI algorithm and the corresponding optimal model parameters, the corresponding lithology label data can be intelligently output by inputting the validation set data into the AI algorithm, so that the intelligent discrimination of drilling rock sound can be realized. Taking the BP neural network algorithm as an example, the learning rate, iteration number, the number of hidden layer nodes, weight and threshold are usually optimized based on training data. In addition, many experimental data and measured data are needed to train and update the AI algorithm model, so that its application scope is wider and prediction accuracy is higher, and finally packaged into a set of intelligent lithology identification software/modules. By embedding the rock voiceprint feature extraction algorithm into the near-bit instrument, the typical rock voiceprint feature parameters (such as MFCC and LPCC with small data volume) are extracted based on the broadband sound signals of the drill bit broken by the downhole instrument. The optimal rock voiceprint parameters are uploaded to the surface processing center in real-time by the high-speed wireless remote transmission technology, and the lithology of the stratum drilled by the drill bit can be identified in real time and intelligently by using the intelligent lithology identification software. When it is allowed, it is also possible to read a variety of rock voiceprint feature parameters, drilling engineering parameters, environmental parameters, and so on in the system, and carry out lithology comprehensive discrimination to improve lithology prediction accuracy as much as possible through statistical analysis or voiceprint parameter automatic optimization. In a specific implementation, not only a single rock voiceprint feature and a single AI algorithm can be selected for lithology identification, but also a set of intelligent, multi-level rock voiceprint identification systems can be built by using a variety of rock voiceprint features and a variety of AI algorithms to realize the intelligent identification of near-bit lithology.

7. Embodiment

In order to verify the reliability of the intelligent lithology identification algorithm, the acoustic data of the rock drilling process were acquired by drilling experiments in the laboratory using a miniature electric drill. In this test, three typical rock sample blocks are used, including sandstone, limestone, and granite. The rock sample sizes are 300 mm*300 mm*300 mm. During the experiments, drilling experiments were carried out in the center of the upper surface of the rock sample, and broadband piezoelectric receiving transducers (receivers) were mounted in the holes in the center of the four sides of the rock sample to record sound signals, and Vaseline was used as a coupling agent to improve the coupling effect between the receiver and the rock. In a specific implementation, a rock sample is placed on a foam plate with a buffering function, and when the drilling rate is stable, a receiver is controlled by an oscilloscope to acquire a rock drilling sound signal. For each drilling experiment, only one set of acoustic data was acquired, and then similar experimental operations were repeated. In this experiment, drilling sound data of 100 sets of data were acquired for each rock sample, and then 80 sets of normal data of each rock sample were selected for AI algorithm training and testing. 60 sets of data for each rock sample were used for AI model training and 20 sets of data were used for AI algorithm model testing.

In the embodiment, a classical BP neural network model is used to verify the prediction accuracy of the method of the present disclosure, and after much training and testing, it is found that such a set of model parameters have a good effect on lithology identification and a fast prediction speed. Specifically, the nodes of the input layer of the neural network are equal to the length of the rock voiceprint feature vector, there are 16 nodes in the hidden layer and 3 nodes in the output layer, the learning rate of the neural network takes a value of 0.02, and the total number of iterations is 500. When the FFT amplitude spectrum is input as the rock voiceprint feature parameter, the number of input layer nodes is 250. When MFCC are input as the rock voiceprint feature parameters, the number of input layer nodes is 13.

FIG. 4A, FIG. 4B and FIG. 4C show raw waveform data of drilling sounds recorded by the sound receiver for three typical rock samples (sandstone, limestone, and granite), the waveform data having been normalized. The horizontal axis is time in microseconds (us); the vertical axis is the data number, and there are 80 sets of data for each rock sample.

FIG. 5A, FIG. 5B and FIG. 5C show waveform data after band-pass filtering raw waveform data of drilling sounds for three typical rock samples (sandstone, limestone, and granite), with a filtering range of 500 Hz-15 kHz. The horizontal axis is time in microseconds (us); the vertical axis is the data number, and there are 80 sets of data for each rock sample.

FIG. 6A, FIG. 6B and FIG. 6C show graphs of voiceprint feature parameter-amplitude spectrum extracted after drilling sound filtering of three types of rock samples acquired by a laboratory; the horizontal axis is frequency number, the vertical axis is data number, and there are 80 groups of amplitude spectra for each rock sample.

FIG. 7A, FIG. 7B and FIG. 7C are graphs of voiceprint feature parameter-MFCC extracted after drilling sound filtering of three types of rock samples acquired by a laboratory, and there are 80 groups of MFCC for each rock sample.

FIG. 8A and FIG. 8B are graphs comparing the results of intelligent lithology identification using BP neural network algorithm based on two voiceprint feature parameters of amplitude spectrum and MFCC of rock drilling sound acquired by a laboratory; the horizontal axis is the data number, the vertical axis is the data label value, the number 1 in the vertical axis represents sandstone, the number 2 represents limestone, and the number 3 represents granite; small circles connected by solid lines represent accurate data label values, while asterisks connected by dashed lines represent data label values predicted by the BP neural network algorithm. The prediction accuracy of the two voiceprint feature parameters as the input data of the BP neural network is more than 90%.

FIG. 9A and FIG. 9B are graphs comparing the results of intelligent lithology identification using the SVM algorithm based on two voiceprint feature parameters of amplitude spectrum and MFCC of rock drilling sound acquired by a laboratory; the horizontal axis is the data number, the vertical axis is the data label value, the number 1 in the vertical axis represents sandstone, the number 2 represents limestone, and the number 3 represents granite; small circles connected by solid lines represent accurate data label values, while asterisks connected by dashed lines represent data label values predicted by the SVM algorithm. The prediction accuracy of the two voiceprint feature parameters as the SVM input data reaches more than 95%.

In conclusion, this novel intelligent near-bit lithology identification algorithm only needs to transmit a small amount of rock voiceprint feature data from the well to the surface processing center for lithology prediction analysis. For example, for the FFT amplitude spectrum, there are only 250 or even 100 data points in each group; in particular, for the MFCC, there are only 13 data points in each group of data, and other data points can be selected when calculating the parameters; the amount of data that needs to be transferred between the well and the earth is significantly reduced compared to the large amount of waveform data that would be recorded by conventional acoustic while drilling methods. When only 13 voiceprint feature data points are used as input, the accuracy of the AI algorithm reaches more than 90%, which provides a better theoretical and experimental basis for real-time lithology discrimination of near-bit under measurement-while-drilling.

The advantages of the intelligent method for identifying near-bit lithology proposed by the present disclosure are mainly embodied in two aspects: on one hand, according to the algorithm, the processed rock voiceprint feature of the sound signal excited by the drill bit fracturing the rock is used, the sound source or transmitting transducer required by the conventional method can be eliminated, the mechanical and circuit structure of the near-bit acoustic instrument can be simplified and the manufacturing cost of the instrument can be reduced; on the other hand, because the extraction of rock voiceprint feature parameters can be performed in the downhole near-bit instrument, only a very small amount of rock voiceprint feature data needs to be transmitted between the well and the ground, compared with the traditional acoustic logging while drilling or the volume of seismic data while drilling, this kind of data reduces by 1 to 3 orders of magnitude, which can greatly improve the real-time of obtaining near-bit stratum lithology data on the surface, and thus can better and more timely avoid drilling risks. In conclusion, this new set of methods can provide anew theoretical method and technical support for the precise landing of drilling in complex reservoirs, the improvement of drilling rate, and the optimization of drilling process, which has great scientific research significance and production application prospect.

Figure 10:
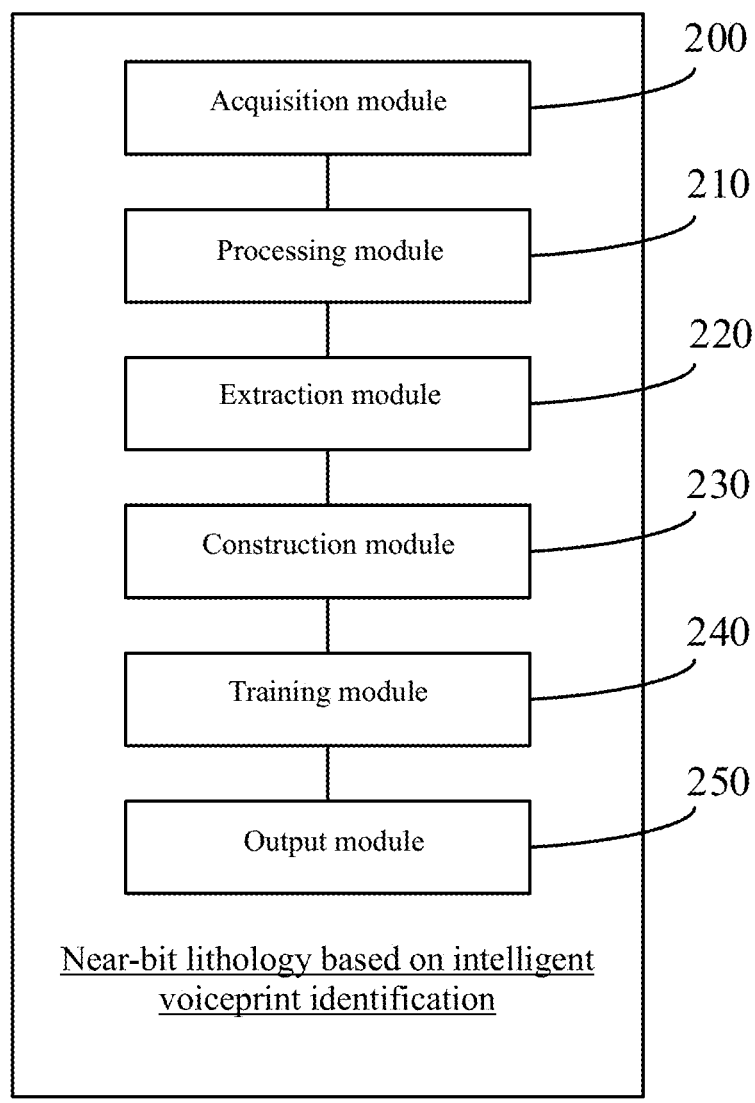
FIG. 10 is a schematic block diagram of a device for identifying near-bit lithology based on intelligent voiceprint identification according to an embodiment of the present disclosure.

As shown in FIG. 10, the device for identifying near-bit lithology based on intelligent voiceprint identification includes an acquisition module 200, a processing module 210, an extraction module 220, a construction module 230, a training module 240 and an output module 250. The various modules may perform the various steps/functions of the method for identifying near-bit lithology based on intelligent voiceprint identification described hereinabove. Only the main functions of the components of the device will be described below, and details already described above will be omitted.

An acquisition module 200 for acquiring rock sound data;
a processing module 210 for pre-processing the acquired rock sound data;
an extraction module 220 for extracting voiceprint features of the pre-processed rock sound;
a construction module 230 for establishing a rock voiceprint feature database;
a training module 240 for training an intelligent voiceprint identification algorithm according to lithology labels and the rock voiceprint feature data in the rock voiceprint feature database; and
an output module 250 for carrying out intelligent identification/prediction on the rock voiceprint features using an intelligent voiceprint identification algorithm, and outputting a lithology identification result.

The modules may be implemented by the processor 102 in the electronic device shown in FIG. 1 executing program instructions stored in the storage 104.

Various component embodiments of the present disclosure may be implemented in hardware, or in a software module running on one or more processors, or in a combination thereof. A person skilled in the art will appreciate that a microprocessor or digital signal processor (DSP) may be used in practice to implement some or all the functions of some modules in a device for identifying near-bit lithology based on the intelligent voiceprint identification according to an embodiment of the present disclosure. The present disclosure can also be embodied as apparatus programs (e.g., computer programs and computer program products) for performing a portion or all of the methods described herein. Such a program implementing the present disclosure may be stored on a computer-readable medium, or may be in the form of one or more signals. Such signals may be downloaded from an Internet website, provided on a carrier signal, or provided in any other form.

While embodiments of the present disclosure have been shown and described, it will be understood by a person skilled in the art that various changes, modifications, substitutions, and alterations may be made herein without departing from the principles and spirit of the present disclosure, the scope of which is defined by the appended claims and their equivalents.

What is claimed is:

1. A method for identifying near-bit lithology based on intelligent voiceprint identification, comprising following steps of:
    S100: acquiring rock sound data;
    S110: pre-processing the acquired rock sound data;
    S120: extracting voiceprint features of the pre-processed rock sound data;
    S130: establishing a rock voiceprint feature database;
    S140: training an intelligent voiceprint identification algorithm according to lithology labels and the voiceprint features of the pre-processed rock sound data in the rock voiceprint feature database; and
    S150: carrying out an intelligent lithology identification on the extracted voiceprint features of the pre-processed rock sound data using the intelligent voiceprint identification algorithm, and outputting a lithology identification result.

2. The method for identifying near-bit lithology according to claim 1, wherein the step S100, wherein the acquired rock sound data comprises:
    acquiring the rock sound data generated by rock fracturing, hitting and drilling, wherein recording a rock fracturing sound by a broadband microphone;
    obtaining the rock sound data by hitting and drilling a cubic rock, and acquiring the rock sound data by a miniature piezoelectric transducer and an oscilloscope;
    obtaining the rock sound data fracturing, scraping, shearing;
    acquiring the rock sound data through recording borehole near-bit acoustic measurement instruments, surface broadband sound pressure sensors, surface broadband vibration sensors, drill string top driven sensors, surface geophones, borehole geophones, hydrophones, and wherein the rock sound data comprises both traditional sound pressure data and three-component vibration data.

3. The method for identifying near-bit lithology according to claim 1, wherein in the step S110, the pre-processing of the acquired rock sound data comprises:
    eliminating or correcting abnormal data in the rock sound data of a rock sample;
    normalizing when there is a big difference for amplitude values of the rock sound data;
    re-sampling when sampling rates of the rock sound data are inconsistent; and
    performing high-pass filtering, low-pass filtering or band-pass filtering on the acquired rock sound data for obtaining data with a high signal-to-noise ratio.

4. The method for identifying near-bit lithology according to claim 1, wherein in the step S120, wherein the extracting voiceprint features of the pre-processed rock sound data comprises:
    inputting the rock sound data generated by rock fracturing, hitting and drilling;
    performing pre-emphasis, framing and windowing of the rock sound data;
    calculating a Fast Fourier Transform (FFT) amplitude spectrum on the rock sound data and obtaining an energy spectrum, and performing Mel-triangle filtering on the obtained energy spectrum;
    taking Napierian logarithms of the Mel-triangle filtered energy spectrum to obtain a logarithmic energy spectrum;
    performing discrete cosine transformation on the obtained logarithmic energy spectrum, and outputting the voiceprint features;
    extracting a Power Normalized Cepstrum Coefficient, a Gammatone Frequency Cepstrum Coefficient and other rock voiceprint features through gamma pass filtering.

5. The method for identifying near-bit lithology according to claim 1, wherein in the step S130, wherein the establishing of the rock voiceprint feature database comprises:
    classifying and storing the rock sound data recorded by fracturing, hitting or drilling;
    marking the rock sound data of different types of rock with numeric symbols and storing a voiceprint feature vector, wherein the marking of the rock sound data are data labels; and
    recording simultaneously key information such as instrument or equipment model, time, acquisition, working environment, operator, sampling rate and duration for the rock sound data and the voiceprint features.

6. The method for identifying near-bit lithology according to claim 1, wherein in the step S140, wherein the training of the intelligent voiceprint identification algorithm comprises:
    dividing a part of the rock sound data in the rock voiceprint feature database into a rock voiceprint training data set and another part of the rock sound data into a rock voiceprint verification data set by a random algorithm, and
    performing a model training and a comparison testing by changing initial parameters of the intelligent voiceprint identification algorithm,
    modifying filter parameters of the intelligent voiceprint identification algorithm,
    changing an input of the rock voiceprint feature database, and
    changing a length of a rock voiceprint feature vector to train and optimize the intelligent voiceprint identification algorithm.

7. A device for identifying near-bit lithology based on intelligent voiceprint identification, comprising:
    an acquisition module used for acquiring rock sound data;

a processing module used for pre-processing the acquired rock sound data;

an extraction module used for extracting voiceprint features of the pre-processed rock sound data;

a construction module used for establishing a rock voiceprint feature database;

a training module used for training an intelligent voiceprint identification algorithm according to lithology labels and the voiceprint features of the pre-processed rock sound data in the rock voiceprint feature database; and an output module used for carrying out an intelligent lithology identification on the extracted voiceprint features of the pre-processed rock sound data using the intelligent voiceprint identification algorithm, and outputting a lithology identification result.

8. A computer device, comprising a memory and a processor, the memory storing a computer program, wherein the processor, when executing the computer program, implements the method according to claim 1.

9. A non-transitory computer-readable storage medium having stored thereon a computer program, wherein the computer program, when executed by a processor, implements the method according to claim 1.

* * * * *